United States Patent
Kitahara et al.

(10) Patent No.: US 9,557,552 B2
(45) Date of Patent: Jan. 31, 2017

(54) MICROSCOPE APPARATUS HAVING ELECTRIC AND MANUAL MOVABLE DEVICES

(71) Applicant: OLYMPUS CORPORATION, Tokyo (JP)

(72) Inventors: Akihiro Kitahara, Hino (JP); Shota Takenaga, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 228 days.

(21) Appl. No.: 13/870,827

(22) Filed: Apr. 25, 2013

(65) Prior Publication Data
US 2013/0286474 A1 Oct. 31, 2013

(30) Foreign Application Priority Data
Apr. 27, 2012 (JP) ................................. 2012-103915

(51) Int. Cl.
G02B 21/00 (2006.01)
G02B 21/24 (2006.01)

(52) U.S. Cl.
CPC ............. G02B 21/248 (2013.01); G02B 21/24 (2013.01); G02B 21/241 (2013.01)

(58) Field of Classification Search
CPC . G02B 21/16; G02B 21/0012; G02B 21/0088; G02B 21/24; G02B 21/248
USPC ....................................................... 359/381
See application file for complete search history.

(56) References Cited

U.S. PATENT DOCUMENTS

| 4,653,878 A | 3/1987 | Nakasato et al. |
| 5,315,080 A | 5/1994 | Kaczynski et al. |
| 5,648,869 A | 7/1997 | Ikoh |
| 8,456,770 B2 | 6/2013 | Kimura |

(Continued)

FOREIGN PATENT DOCUMENTS

| DE | 34 10 201.9 A1 | 10/1984 |
| EP | 0 508 076 A1 | 10/1992 |

(Continued)

OTHER PUBLICATIONS

Extended European Search Report (EESR) dated Jul. 25, 2013 (in English) in counterpart European Application No. 13002197.5.

(Continued)

Primary Examiner — Bumsuk Won
Assistant Examiner — Tamara Y Washington
(74) Attorney, Agent, or Firm — Holtz, Holtz & Volek PC

(57) ABSTRACT

A microscope apparatus includes a stage and a revolver that holds objective lenses. At least one of the stage and the revolver constitutes an electric movable device that is electrically operated. The microscope apparatus further includes an input device for inputting a command for operating the electric movable device, a manual focusing device for adjusting a relative distance between the stage and the objective lenses, an operation control device for controlling operation of the electric movable device, a state determining device for determining whether the electric movable device is in an operable state or not, and a restriction device for restricting an output of a control signal for commanding the operation to the operation control device when the command for operating the electric movable device is input if the electric movable device is in an inoperable state.

4 Claims, 12 Drawing Sheets

(56) References Cited

U.S. PATENT DOCUMENTS

| | | | |
|---|---|---|---|
| 2004/0090670 A1 | | 5/2004 | Kawanabe et al. |
| 2010/0053742 A1* | | 3/2010 | Hasegawa ............ G02B 21/248 359/381 |
| 2010/0277581 A1* | | 11/2010 | Matsumoto ............ G02B 21/36 348/79 |
| 2011/0109960 A1 | | 5/2011 | Shirota |

FOREIGN PATENT DOCUMENTS

| | | |
|---|---|---|
| EP | 2 180 363 A1 | 4/2010 |
| EP | 2 322 967 A1 | 5/2011 |
| GB | 2 153 547 A1 | 8/1985 |
| JP | 59172612 A | 9/1984 |
| JP | 03296707 A | 12/1991 |
| JP | 07168101 A | 7/1995 |
| JP | 07333507 A | 12/1995 |
| JP | 08050226 A | 2/1996 |
| JP | 2007-286440 A | 11/2007 |

OTHER PUBLICATIONS

Japanese Office Action (and English translation thereof) dated Mar. 22, 2016, issued in counterpart Japanese Application No. 2012-103915.

* cited by examiner

MICROSCOPE APPARATUS HAVING ELECTRIC AND MANUAL MOVABLE DEVICES

CROSS REFERENCES TO RELATED APPLICATIONS

This application is based upon and claims the benefit of priority from Japanese Patent Application No. 2012-103915, filed on Apr. 27, 2012, the entire contents of which are incorporated herein by reference.

BACKGROUND

1. Technical Field

The present invention relates to a microscope apparatus.

2. Related Art

Microscope apparatuses capable of observing a magnified image of a fine specimen and recording the observation image as a picture or a video image have been used in a wide variety of fields such as biological fields or industrial fields. In the industrial fields, for example, the microscope apparatuses have been used for observing microstructures of a metal or used as an inspection apparatus in a process of manufacturing a semiconductor device or an LCD (liquid crystal display).

Since the microscope apparatus is used for the above-described various fields, in many cases, components thereof are configured as units, so that the microscope apparatus may be used in various uses according to a combination of the units.

Among the units, there are movable units which are electrically operated, such as an electric stage. Beside the electric stage, there are many units comprising the electric movable device. However, there are still a lot of units comprising a manual movable device.

In the microscope apparatus, in some cases, if the movable device is manipulated carelessly, the movable device could come into contact with other devices. Although the electric movable device can be operated by simple manipulation, even in the state where contact may occur if there is no method of preventing the contact, the electric movable device performs the associated operation as it is. Particularly, in an inverted microscope, since the objective lens is inserted into an aperture of the stage, it is difficult for a user to determine the occurrence of contact. If switching of the electric revolver is manipulated carelessly, the objective lens could come into contact with the specimen or the stage, so that the specimen or the objective lens may be damaged.

In order to solve this problem, there is disclosed a technique for a safe observation, which can be performed by rotating an electric revolver after recessing the position of a focusing device or a stage in the case of an objective lens potentially coming into contact with the stage. In this case, the potential contact can be determined by the information of the position of the focusing device and the stage obtained by tracing a rotation trajectory of the objective lens (refer to, for example, Japanese Laid-open Patent Publication No 2007-286440).

SUMMARY

In some embodiments, a microscope apparatus includes stage on which a specimen is mounted, a revolver that holds a plurality of objective lenses and is configured to cause one of the plurality of objective lenses to be arranged on an observation light axis by a revolving motion. At least one of the stage and the revolver constitutes an electric movable device that is electrically operated. The microscope apparatus further includes an input device configured to input a command for operating the electric movable device; a manual focusing device configured to adjust a relative distance between the stage and the objective lenses; an operation control device configured to control operation of the electric movable device; a state determining device configured to determine that the electric movable device is in an operable state when the objective lenses and the stage are separated by a specified interval or more and to determine that the electric movable device is in an inoperable state when the objective lenses and the stage are separated by less than the specified interval; and a restriction device configured to restrict an output of a control signal for commanding the operation to the operation control device when the command for operating the electric movable device is input by the input device if the state determining device determines that the electric movable device is in the inoperable state.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments will be described with reference to the accompanying drawings. The present invention is not limited to the embodiments, but various changes thereof may be available without departing from the scope of the invention.

Figure 1:
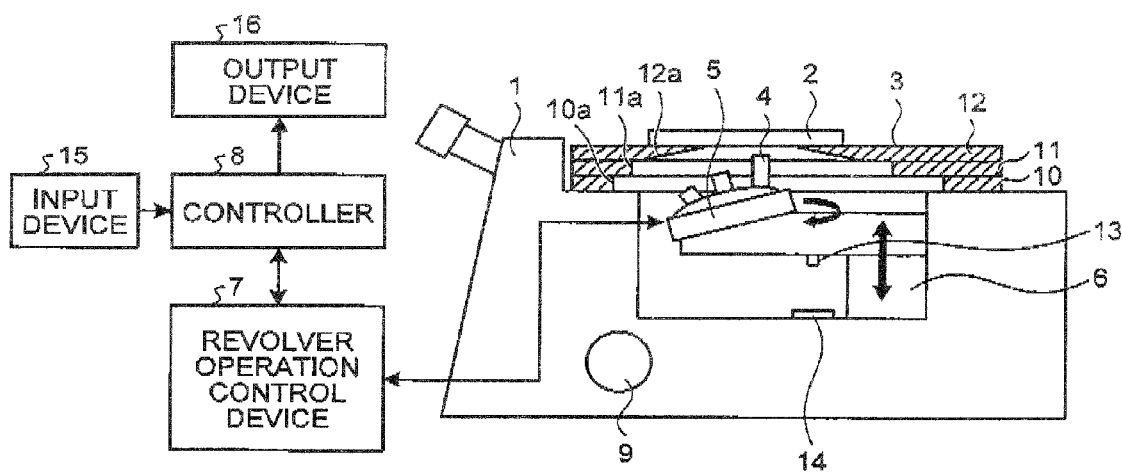
FIG. 1 is a schematic diagram illustrating a configuration of an inverted microscope apparatus according to a first embodiment of the present invention.

FIG. 1 is a schematic diagram of a configuration of an inverted microscope apparatus according to a first embodiment of the present invention. The inverted microscope apparatus includes a microscope main body 1, a stage 3 on which a specimen 2 is mounted, an electric revolver 5 which holds a plurality of objective lenses 4 and which is configured to electrically cause selected one of the objective lenses 4 to be arranged on an observation light axis, and a manual focusing device 6 which supports the electric revolver 5 and which is configured to adjust a distance between the specimen 2 (stage 3) and the objective lens 4.

Figure 2:
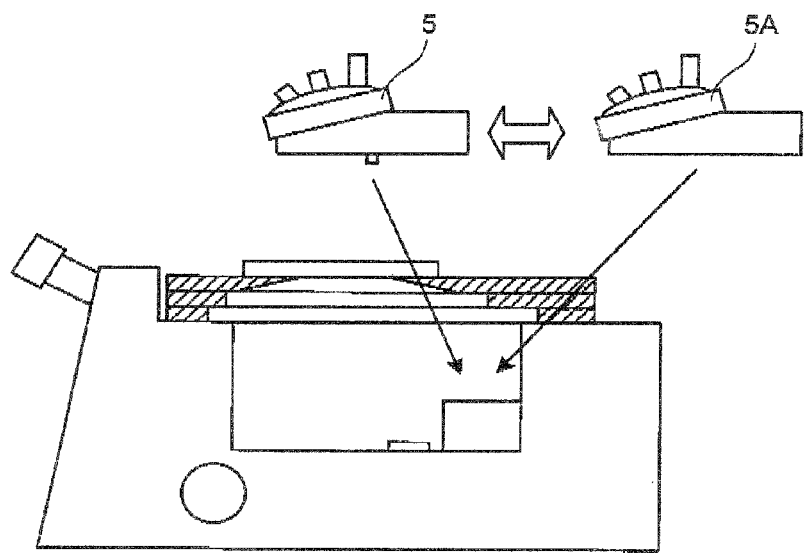
FIG. 2 is a diagram illustrating switching between revolvers in the inverted microscope apparatus illustrated in FIG. 1.

The electric revolver 5 is fixed to the manual focusing device 6 by fastener members (not illustrated) such as bolts. A user rotates a focusing handle 9 to lift up and down the manual focusing device 6 so that the distance between the specimen 2 and the objective lens 4 can be adjusted. The electric revolver 5 is replaceable with a manual revolver 5A as illustrated in FIG. 2. That is, the electric revolver 5 and the manual revolver 5A can be replaced with one another by a user depending on an observation method. In addition, even if another inverted microscope apparatus is employed in which the electric revolver 5 is mounted in a non-removable manner, it is also considered to be "replaceable" in the case in which the manual focusing device 6 is provided and the manual revolver 5a is attachable to it.

The stage 3 is fixed to the microscope main body 1 by fastener members (not illustrated) such as bolts. The stage 3 is configured to include a lower plate 10, a middle plate 11, and an upper plate 12. The lower plate 10, the middle plate 11, and the upper plate 12 have respective apertures 10a, 11a, and 12a having different sizes. The objective lens 4 is inserted into the apertures 10a, 11a, and 12a, so that the distance between the objective lens 4 and the specimen 2 is adjusted. The stage 3 according to the first embodiment may be used in a manual or electric manner. If the sizes of stages having different sizes are within a specified range, any one of the stages can be used as the stage 3 attached in the microscope main body 1.

The electric revolver 5 is configured to include a microswitch 13 as a state determining device. The microswitch 13 is a mechanical switch and is arranged on the bottom surface of the electric revolver 5. A protrusion 14 is installed in the microscope main body 1 at the position facing the microswitch 13. If the manual focusing device 6 is lowered by rotation of the focusing handle 9, the microswitch 13 is pressed by the protrusion 14. Alternatively, the protrusion 14 may be removed, and the microswitch 13 may be configured to be in a protruded shape. Furthermore, the microswitch 13 may be formed in a protruded shape in the microscope main body 1, and the microswitch 13 may be configured to be pressed by lowering the electric revolver 5. In addition, besides the microswitch 13, a photo-interrupter, a capacitive sensor, or the like may be used as the state determining device.

A revolver operation control device 7 controls operations of the electric revolver 5. If the user selects the objective lens 4 held by the electric revolver 5 through a below-described input device 15, the revolver operation control device 7 controls the operations of the electric revolver 5 so that the selected objective lens 4 is inserted under the specimen 2. The revolver operation control device 7 may be built in the electric revolver 5 or be formed integrally with a below-described controller 8.

The controller 8 is connected to the revolver operation control device 7, the input device 15, and an output device 16. In the first embodiment, the controller 8 functions as a restriction device. If the microswitch 13 is not pressed, even when the objective lens 4 is selected by a below-described input device 15, the controller 8 restricts transmission of information on the selection of the objective lens 4 to the revolver operation control device 7. A PC may be used as the controller 8. In addition, the restriction of the switching between the objective lenses 4 in the revolver operation control device 7 by the controller 8 may be selectively lifted. Therefore, user's convenience can be improved.

The input device 15 is configured to input a command for selecting one of the objective lenses 4 held by the electric revolver 5. The selective input may be performed, for example, by a mechanical switch, a touch panel, or the like. In the first embodiment, the selective input may be made for selecting an objective lens directly or for commanding some divisions of rotation from a current position of the objective lens to the right or left position.

The output device 16 outputs the type of the selected objective lens 4 or the hole number of the electric revolver 5 and outputs the signal signaling whether or not the objective lens 4 selected by the input device 15 could come into contact with the stage 3. For example, an LED or a display may be used as the output device 16. In the case of outputting the existence or non-existence of contact, a buzzer may be used as the output device 16. In addition, a plurality of LEDs and buzzers may he used as the output device 16.

Figure 3:
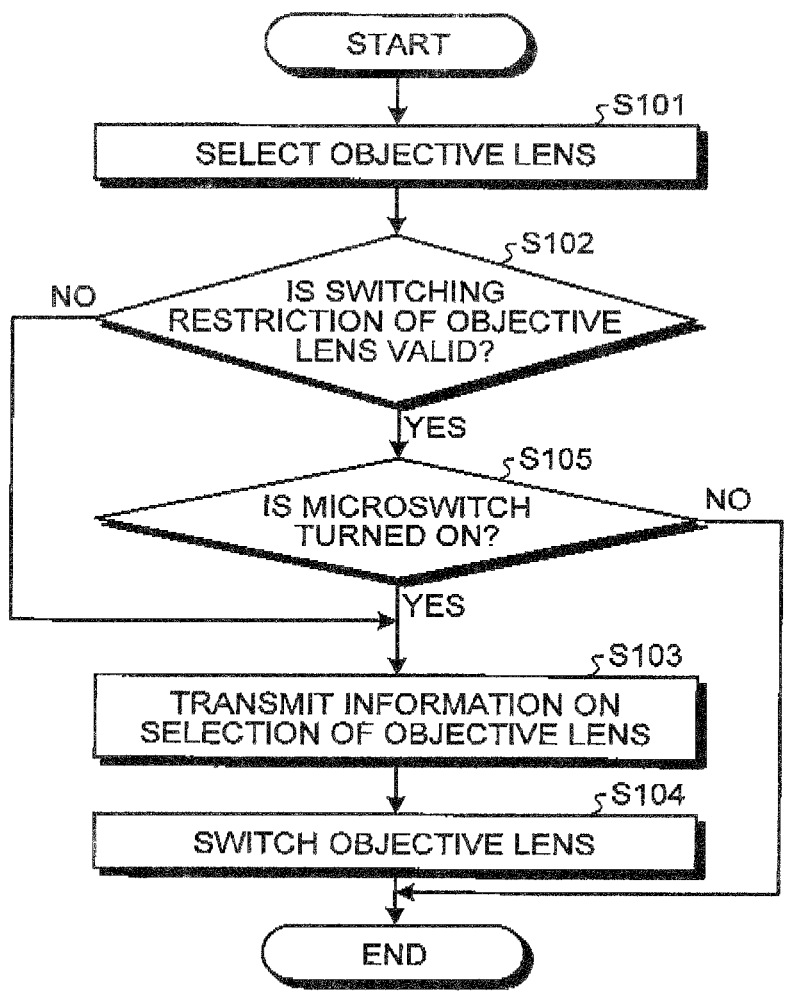
FIG. 3 is a flowchart of a switching operation between objective lenses according to the first embodiment of the present invention.
Figure 4:
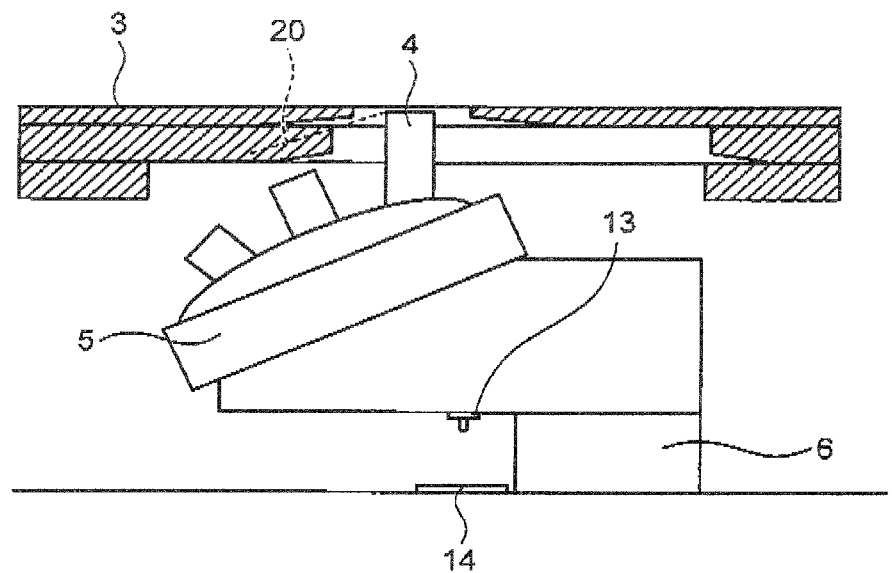
FIG. 4 is a diagram illustrating contact of an objective lens with a stage in the inverted microscope apparatus illustrated in FIG. 1.
Figure 5:
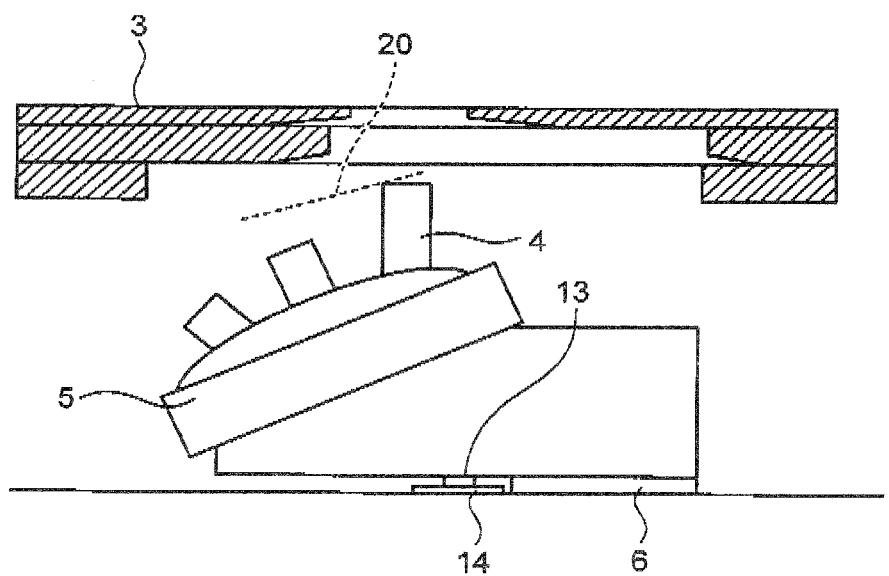
FIG. 5 is a diagram illustrating the contact of the objective lens with the stage in the inverted microscope apparatus illustrated in FIG. 1.

Next, an operation of switching the objective lens 4 in the inverted microscope apparatus according to the first embodiment of the present invention will be described with reference to the drawings. FIG. 3 is a flowchart of a switching operation between the objective lenses 4 according to the first embodiment of the present invention. FIGS. 4 and 5 are diagrams illustrating the contact of the objective lens 4 with the stage 3 in the inverted microscope apparatus illustrated in FIG. 1.

As illustrated in FIG. 3, when the user switches to the objective lens 4 for observation of the specimen 2, the objective lens 4 is selected using the input device 15 (Step S101).

After the objective lens 4 is selected in Step S101, the controller 8 determines whether or not the switching restriction of the objective lenses 4 is valid (Step S102). If the switching restriction of the objective lens 4 is not valid (No in Step S102), the controller 8 transmits the information on the selection of the objective lens 4 selected in Step S101 to the revolver operation control device 7 (Step S103), and the revolver operation control device 7 receives the information on the selection of the objective lens and controls the electric revolver 5 to insert the selected objective lens 4 under the specimen 2 to switch to the objective lens 4 (Step S104).

If the switching restriction of the objective lens 4 is valid (Yes in Step S102), the controller 8 determines whether or not the microswitch 13 is pressed (Step S105).

If the microswitch 13 is not pressed (No in Step S105), the objective lens 4 inserted under the specimen 2 and the stage 3 are separated from each other by less than a specified interval. If the electric revolver 5 is operated in this state, the objective lens 4 comes into contact with the stage 3 due to a rotation trajectory 20 of the objective lens 4 indicated by a dotted line illustrated in FIG. 4. Therefore, it is determined that the electric revolver 5 is in an inoperable state, so that the controller 8 ends the operation of switching between the objective lenses 4.

When the microswitch 13 is pressed (Yes in Step S105), the objective lens 4 inserted under the specimen 2 and the stage 3 are separated from each other by the specified interval or more. Therefore, it is determined that the electric revolver 5 is in an operable state, and the controller 8 transmits the information on the selection of the objective lens 4 (Step S103), and the revolver operation control device 7 receives the information on the selection of the objective lens and switches to the objective lens 4 (Step S104).

In the first embodiment, although the controller 8 functions as a restriction device, the revolver operation control device 7 may also function as a restriction device.

In the first embodiment, since the operable and inoperable states of the electric revolver 5 can be determined by the microswitch 13, it is possible to prevent the contact of the objective lens 4 with the stage 3 during the switching between the objective lenses 4, with a simple configuration, without performing complicated processes such as calculation of the rotation trajectory of the objective lens 4.

In addition, in the first embodiment, since the electric revolver 5 and the manual revolver 5A are replaceable with each other, in an inverted microscope apparatus having the manual revolver 5A, the manual revolver 5A can be replaced with the electric revolver 5. Therefore, a part of a manual microscope can be upgraded to have an electric configuration. In addition, this configuration is suitable for appropriately switching between the electric revolver 5 and the manual revolver 5A.

Although the inverted microscope apparatus is described as an example in the first embodiment, the first embodiment may be applied to an upright microscope apparatus. In the inverted microscope apparatus, since the moving range of the manual focusing device 6 is narrow, even if the determination of the operable state and inoperable state of the electric movable device by the microswitch 13 is made at the lowermost limit of the movable range of the manual focusing device 6, there is no need to increase the moving amount of the manual focusing device 6, and it is possible to appropriately shorten the time required for switching between the objective lenses 4.

Figure 6:
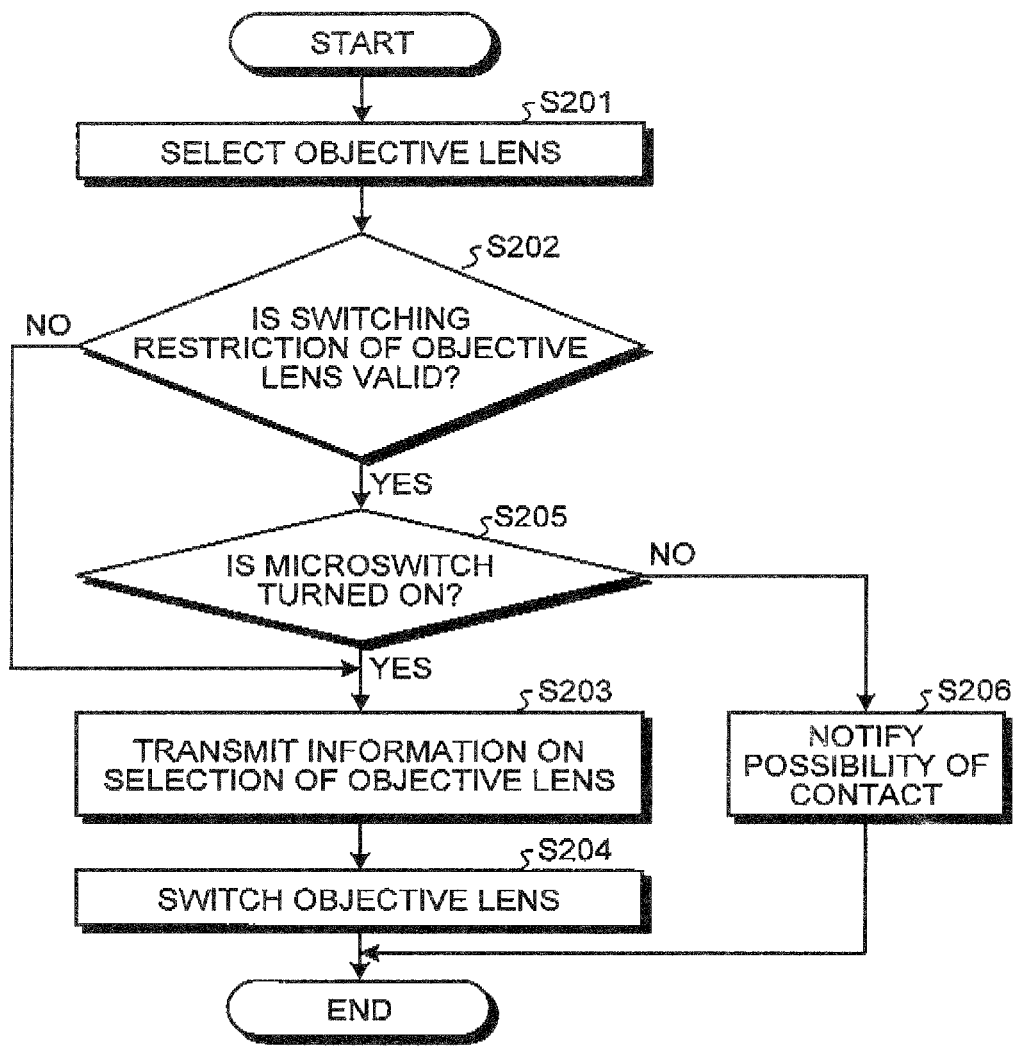
FIG. 6 is a flowchart of a switching operation between the objective lenses according to Modified Example 1 of the first embodiment of the present invention.

In addition, in the first embodiment, if the microswitch 13 is not pressed, the potential contact of the objective lens 4 with the stage 3 may be notified by the output device 16. FIG. 6 is a flowchart of a switching operation between the objective lenses 4 according to Modified Example 1 of the first embodiment of the present invention.

In Modified Example 1, Steps S201 to S204 are the same as Steps S101 to S104 of the first embodiment. If the switching restriction of the objective lens 4 is valid (Yes in Step S202), the controller 8 determines whether or not the microswitch 13 is pressed (Step S205). If the microswitch 13 is not pressed (No in Step S205), the output device 16 is allowed to notify the contact of the objective lens 4 with the stage 3 (Step S206).

When the microswitch 13 is pressed (Yes in Step S205), the controller 8 transmits the information on the selection of the objective lens 4 (Step S203), and the revolver operation control device 7 receives the information on the selection of the objective lens and switches to the objective lens 4 (Step S204).

Figure 7:
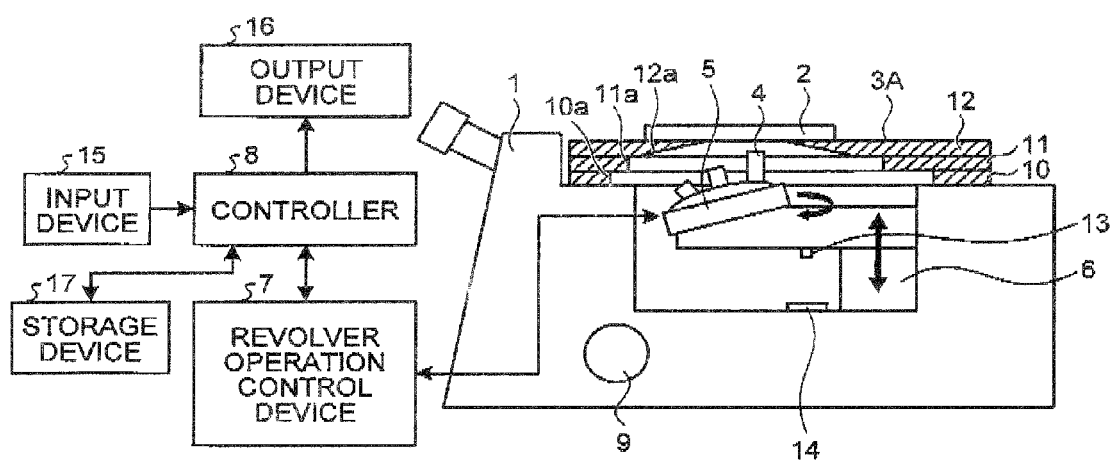
FIG. 7 is a schematic diagram illustrating a configuration of an inverted microscope apparatus according to Modified Example 2 of the first embodiment of the present invention.

In addition, an inverted microscope apparatus illustrated in FIG. 7 can be exemplified as Modified Example 2 of the first embodiment. Modified Example 2 is different from the first embodiment in that an inverted microscope apparatus according to Modified Example 2 includes a storage device 17 which stores a command of selection of the objective lens 4 by the input device 15.

Figure 8:
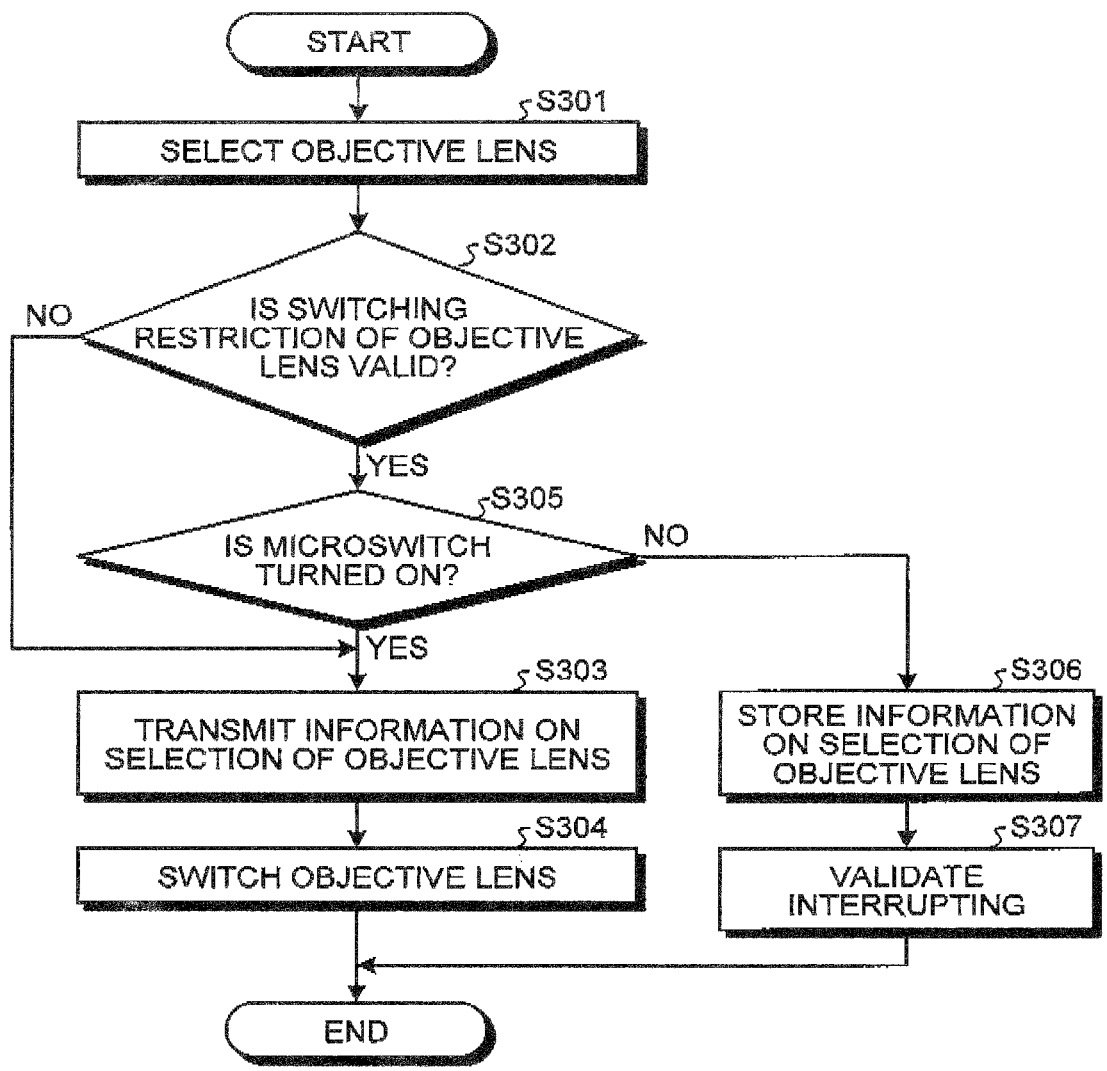
FIG. 8 is a flowchart of a switching operation between the objective lenses according to Modified Example 2 of the first embodiment of the present invention.

A switching operation between the objective lenses 4 according to Modified Example 2 of the first embodiment of the present invention will be described with reference to the drawings. FIG. 8 is a flowchart of a switching operation between the objective lenses 4 according to Modified Example 2 of the first embodiment of the present invention.

As illustrated in FIG. 8, if the objective lens 4 is selected using the input device 15 (step S301), the controller 8 determines whether or not the switching restriction of the objective lens 4 is valid (Step S302). If the switching restriction of the objective lens 4 is not valid (No in Step S302), the controller 8 transmits the information on the selection of the objective lens 4 (Step S303), and the revolver operation control device 7 switches the objective lens 4 (Step S304).

If the switching restriction of the objective lens 4 is valid (Yes in Step S302), the controller 8 determines whether or not the microswitch 13 is pressed (Step S305). When the microswitch 13 is pressed (Yes in Step S305), the controller 8 transmits the acquired information on the selection of the objective lens 4 (Step S303), and the revolver operation control device 7 receives the information on the selection of the objective lens and switches to the objective lens 4 (Step S304).

If the microswitch 13 is not pressed (No in Step S305), the information on the selection of the objective lens 4 in Step S301 is stored in the storage device 17 (Step S306), and an interrupting process is validated (Step S307).

Figure 9:
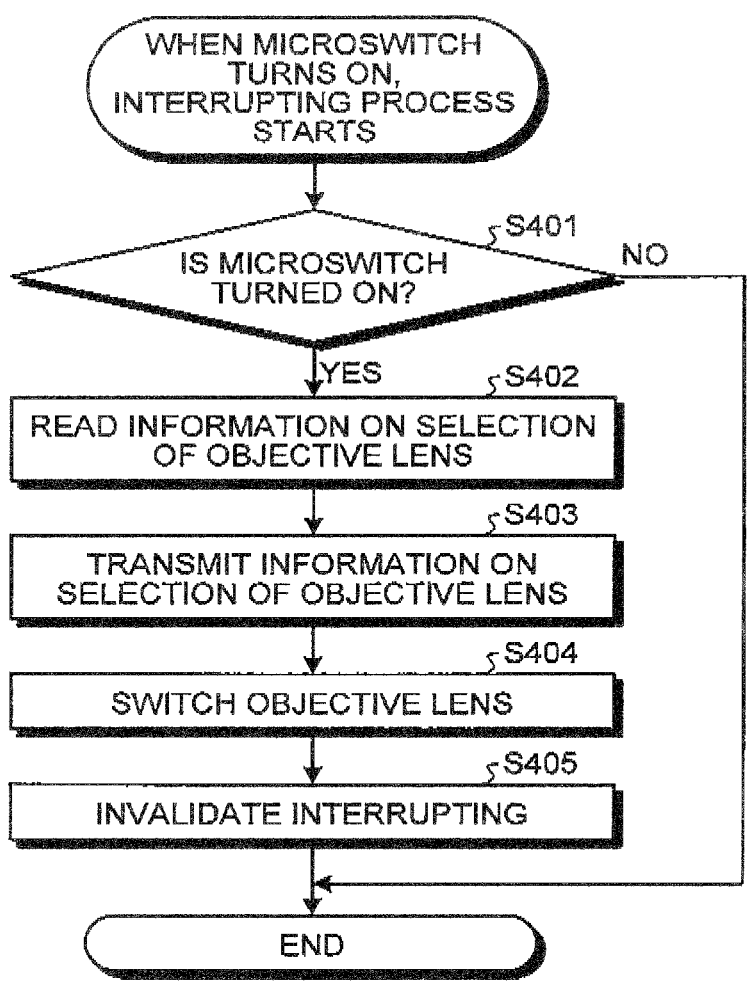
FIG. 9 is a flowchart of an interrupting process illustrated in FIG. 8.

The interrupting process in Step S307 is illustrated in FIG. 9. The controller 8 determines whether or not the microswitch 13 is pressed (Step S401). When the microswitch 13 is pressed (Yes in Step S401), the controller 8 reads the information on the selection of the objective lens from the storage device 17 (Step S402) and transmits the read information on the selection of the objective lens to the revolver operation control device 7 (Step S403). The revolver operation control device 7 receives the information on the selection of the objective lens, switches to the objective lens 4 (Step S404). The interrupting process is invalidated (Step S405).

If the microswitch 13 is not pressed (No in Step S401), the interrupting process is ended.

In Modified Example 2 of the first embodiment, even when the transmission of the information on the selection of the objective lens 4 is restricted, there is no need to select the objective lens 4 again, and it is possible to further shorten the time required for switching between the objective lenses 4. In addition, if the information on the selection of the objective lens 4 is input several times, the information on the selection of the objective lens 4 stored in the storage device 17 may be the information on the selection of the objective lens 4 which is first selected. If the storage device 17 can store a plurality of information items on the selection of the objective lens, the information on the selection of the objective lens 4 which is finally selected may be transmitted.

Figure 10:
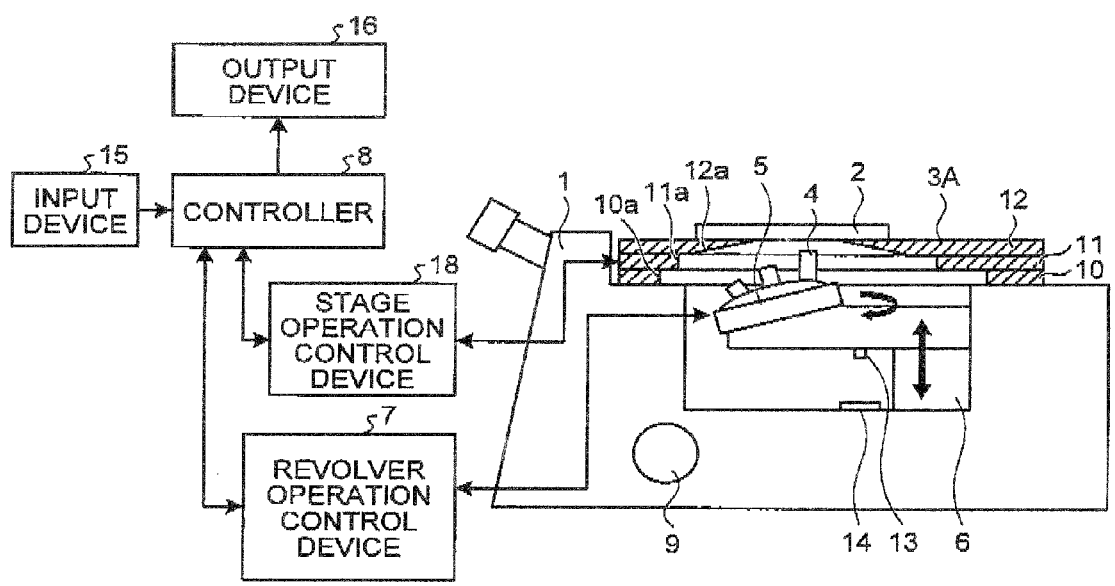
FIG. 10 is a schematic diagram illustrating a configuration of an inverted microscope apparatus according to a second embodiment of the present invention.

FIG. 10 is a schematic diagram illustrating a configuration of an inverted microscope apparatus according to the second embodiment of the present invention. The stage according to the second embodiment of the present invention is an electric stage 3A. The electric stage 3A is connected to a controller 8 through a stage operation control device 18.

If a user inputs an operation of returning to the origin through the input device 15, the objective lens 4 inserted under the specimen 2 could come into contact with the electric stage 3A depending on positions of the electric revolver 5 and the electric stage 3A.

Therefore, in the second embodiment, the microswitch 13 determines that the electric stage 3A is in an operable state when the objective lens 4 and the electric stage 3A are separated from each other by a specified interval or more, and determines that the electric stage 3A is in an inoperable state when the objective lens 4 and the electric stage 3A are separated from each other by less than the specified interval. If the microswitch 13 is not pressed, that is, if the electric stage 3A is in the inoperable state, the controller 8 restricts transmission of a command of returning the electric stage 3A to the origin. In addition, besides the microswitch 13, a photo-interrupter, a capacitive sensor, or the like may be used as a state determining device of the second embodiment. In addition, the restriction of the returning of the electric stage 3A to the origin by the controller 8 may be selectively lifted. Therefore, user's convenience can be improved.

Figure 11:
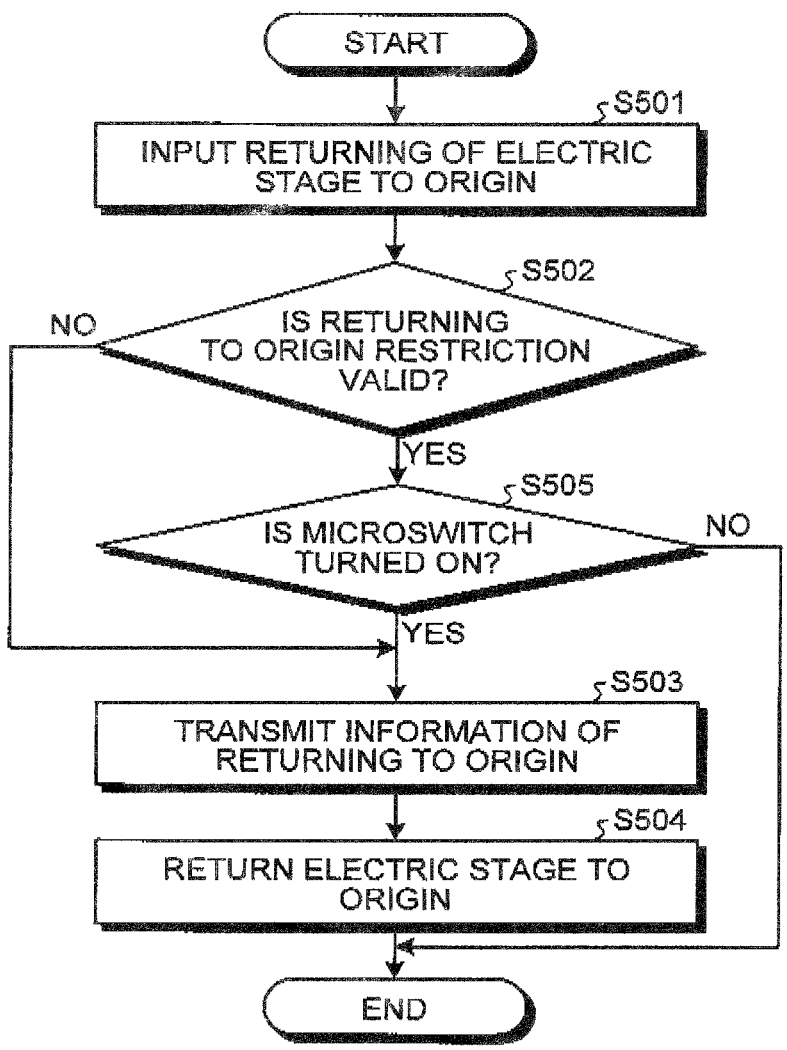
FIG. 11 is a flowchart of an operation of returning an electric stage to an origin according to the second embodiment of the present invention.

An operation of returning the electric stage to the origin in the inverted microscope apparatus according to the second embodiment of the present invention will be described with reference to the drawings. FIG. 11 is a flowchart of the operation of returning the electric stage to the origin in the second embodiment of the present invention.

As illustrated in FIG. 11, when returning of the electric stage 3A to the origin is commanded by the user, the input device 15 is operated (Step S501).

After the returning of the electric stage 3A to the origin is commanded in Step S501, the controller 8 determines whether or not the returning of the electric stage 3A to the origin restriction is valid (Step S502). If the returning of the electric stage 3A to the origin restriction is not valid (No in Step S502), the controller 8 transmits information on the command of returning the electric stage 3A to the origin commanded, in Step S501 to the stage operation control device 18 (Step S503), and the stage operation control device 18 receives the information on the command of returning to the origin and returns the electric stage 3A to the origin (Step 504).

If the returning of the electric stage 3A to the origin restriction is valid (Yes in Step S502), the controller 8 determines whether or not the microswitch 13 is pressed (Step S505).

If the microswitch 13 is not pressed (No in Step S505), the objective lens 4 inserted under the specimen 2 and the electric stage 3A are separated from each other by less than a specified interval. If the electric stage 3A is returned to the origin in this state, the objective lens 4 comes into contact with the electric stage 3A. Therefore, it is determined that the electric stage 3A is in the inoperable state, so that the controller 8 ends the operation of returning the electric stage 3A to the origin.

When the microswitch 13 is pressed. (Yes in Step S505), the objective lens 4 inserted under the specimen 2 and the electric stage 3A are separated from each other by the specified interval or more, and it is determined that the electric stage 3A is in the operable state. Therefore, the controller 8 transmits information on the returning of the electric stage 3A to the origin (Step S503), and the stage operation control device 18 receives the information on the returning to the origin and returns the electric stage 3A to the origin (Step S504).

In the second embodiment, although the controller 8 may function as a restriction device, the stage operation control device 18 may also function as a restriction device. In addition, although the inverted microscope apparatus illustrated in FIG. 10 includes the electric revolver 5 and the revolver operation control device 7, the manual revolver 5A may be used if it has a state determining device. In addition, in the second embodiment, although the inverted microscope apparatus is described as an example, the same description be applied to an upright microscope apparatus.

In the second embodiment, since the operable and inoperable states of the electric stage 3A can be determined by the microswitch 13, it is possible to prevent the contact the objective lens 4 with the electric stage 3A during the operation of returning the electric stage 3A to the origin by using a simple configuration without performing a process of acquiring information on the position of the objective lens 4.

Figure 12:
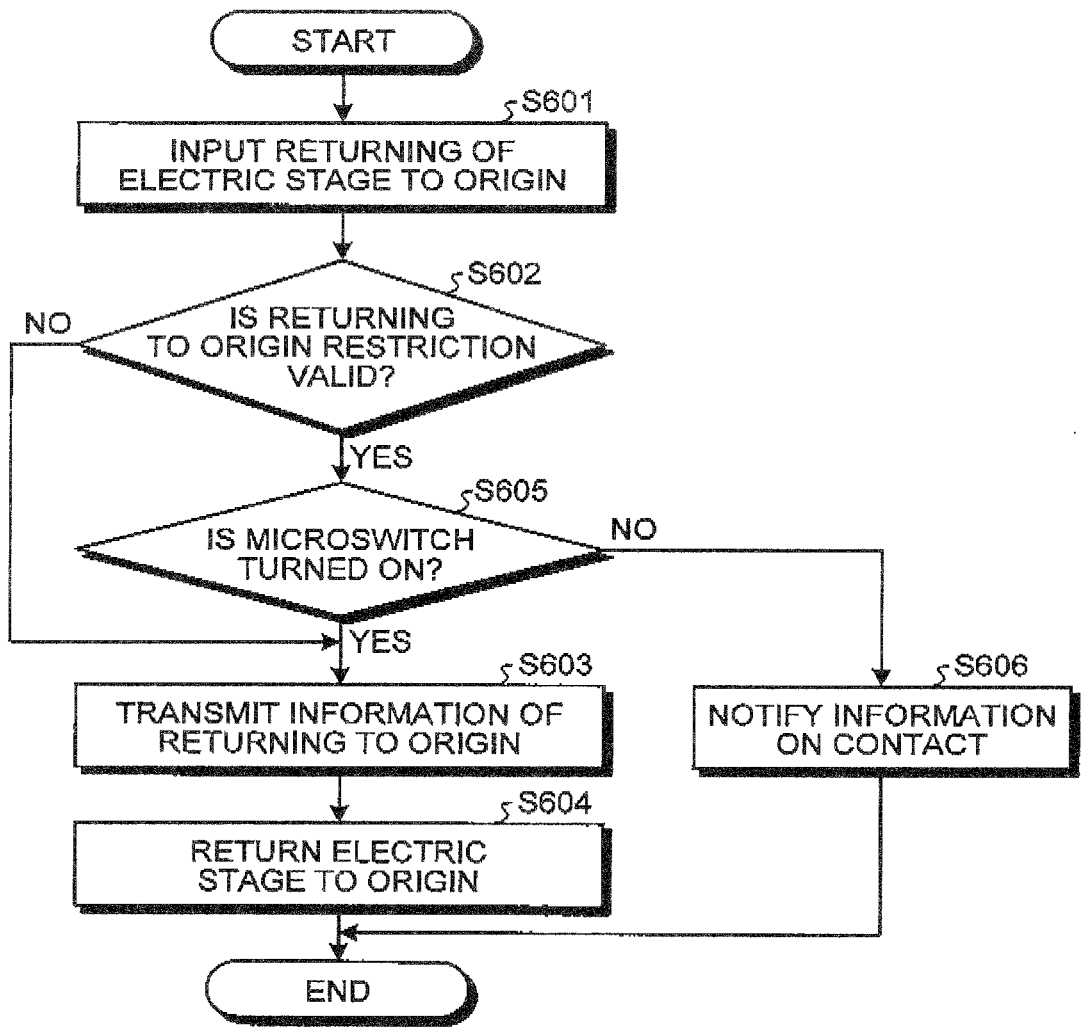
FIG. 12 is a flowchart of an operation of returning an electric stage to an origin according to Modified Example 1 of the second embodiment of the present invention.

In addition, in the second embodiment, if the microswitch 13 is not pressed, the output device 16 may be allowed to notify the contact of the objective lens 4 with the electric stage 3A. FIG. 12 is a flowchart of an operation of returning the electric stage to the origin according to Modified Example 1 of the second embodiment of the present invention.

In Modified Example 1, Steps S601 to S604 are the same as Steps S501 to S504 of the second embodiment, respectively. If the returning to the origin restriction is valid (Yes in Step S602), the controller 8 determines whether or not the microswitch 13 is pressed (Step S605). If the microswitch 13 is not pressed (No in Step S605), the output device 16 is allowed to notify a possibility of the contact of the objective lens 4 with the electric stage 3A (Step S606).

When the microswitch 13 is pressed (Yes in Step S605), the controller 8 transmits the information on the returning to the origin (Step S603), and the stage operation control device 18 receives the information on the returning to the origin and returns the electric stage to the origin (Step S604)

Figure 13:
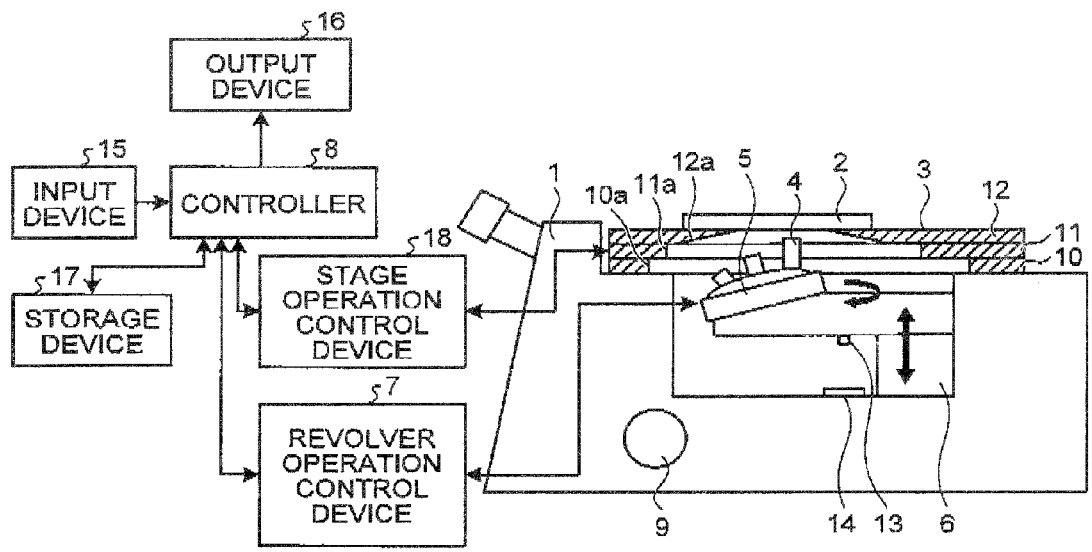
FIG. 13 is a schematic diagram illustrating a configuration of an inverted microscope apparatus according to Modified Example 2 of the second embodiment of the present invention.

In addition, an inverted microscope apparatus illustrated in. FIG. 13 may be exemplified as Modified Example 2 of the second embodiment. Modified Example 2 different from the second embodiment in that the inverted microscope apparatus according to Modified Example 2 includes a storage device 17 which stores the information on the returning of the electric stage 3A to the origin which is input by the input device 15.

In Modified Example 2 of the second embodiment, even when the transmission of information on the returning of the electric stage 3A to the origin is restricted, there is no need to input the returning to the origin again, and it is possible to further shorten the time required for the operation of returning the electric stage 3A to the origin.

Figure 14:
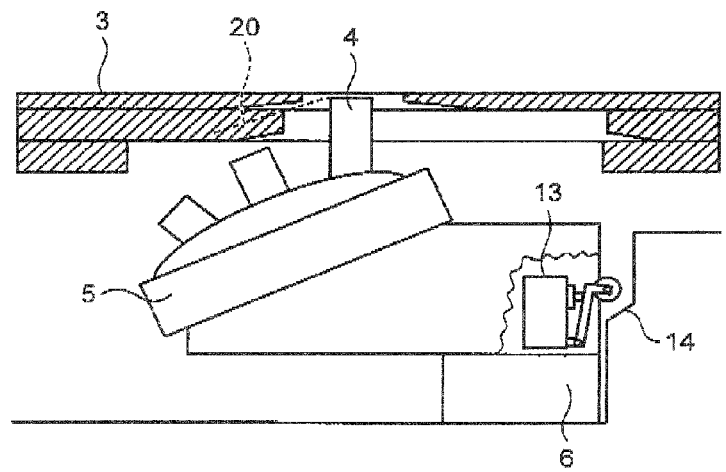
FIG. 14 is a schematic partial cross-sectional diagram illustrating a configuration of an inverted microscope apparatus according to a third embodiment of the present invention.

FIG. 14 is a schematic partial enlarged diagram illustrating a configuration of an inverted microscope apparatus according to a third embodiment of the present invention. The third embodiment of the present invention is different from the first embodiment in that the inverted microscope apparatus according to the third embodiment is configured so that the microswitch 13 is arranged on the rear side surface of the electric revolver 5. In addition, the protrusion 14 is arranged on the rear side surface of the microscope main body 1. The position of the protrusion 14 in the lateral direction is the position where the protrusion 14 is in contact with the microswitch 13 when the electric revolver 5 is moved up and down. The position thereof in the height direction is the position where the objective lens 4 does not contact with the stage 3 during the driving of the electric revolver 5 by taking into consideration the objective lens 4 attachable to the electric revolver 5 and the stage 3 attachable to the inverted microscope apparatus. In the third embodiment, if the manual focusing device 6 is lifted down and the microswitch 13 is pressed by the protrusion 14, the driving of the electric revolver 5 can be performed. In the state where the microswitch 13 is not pressed, since the objective lens 4 becomes to be contacted with the stage 3, the driving of the electric revolver 5 is restricted. Besides the microswitch 13, a photo-interrupter, a capacitive sensor, or the like may be used as a state determining device of the third embodiment.

As illustrated in FIG. 14, if the microswitch 13 is not pressed, the objective lens 4 becomes to be contacted with the stage 3 as illustrated in the rotation trajectory 20 of the objective lens 4 in FIG. 14. Therefore, even when the information on the selection of the objective lens 4 is input through the input device 15, the controller 8 restricts the transmission of the information on the selection of the objective lens 4 to the revolver operation control device 7.

Figure 15:
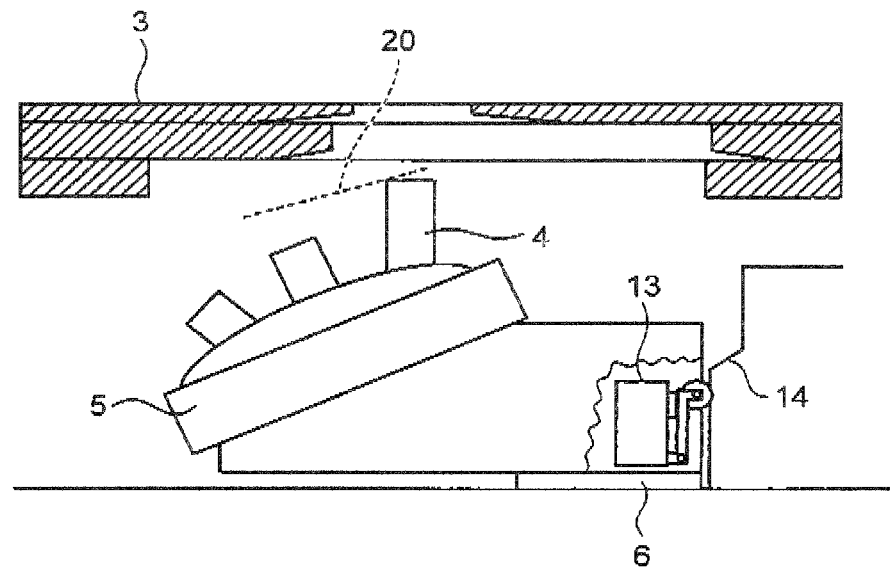
FIG. 15 is a partial cross-sectional diagram illustrating a switching state of a switch of the inverted microscope apparatus illustrated in FIG. 14.

The output device 16 is allowed to notify a possibility of the contact of the objective lens 4 with the stage 3, and the user lifts down the electric revolver 5. Therefore, as illustrated in FIG. 15, the microswitch 13 is pressed by the protrusion 14, so that the controller 8 lifts the restriction of the transmission of the information on the selection of the objective lens 4 to the revolver operation control device 7.

Figure 16:
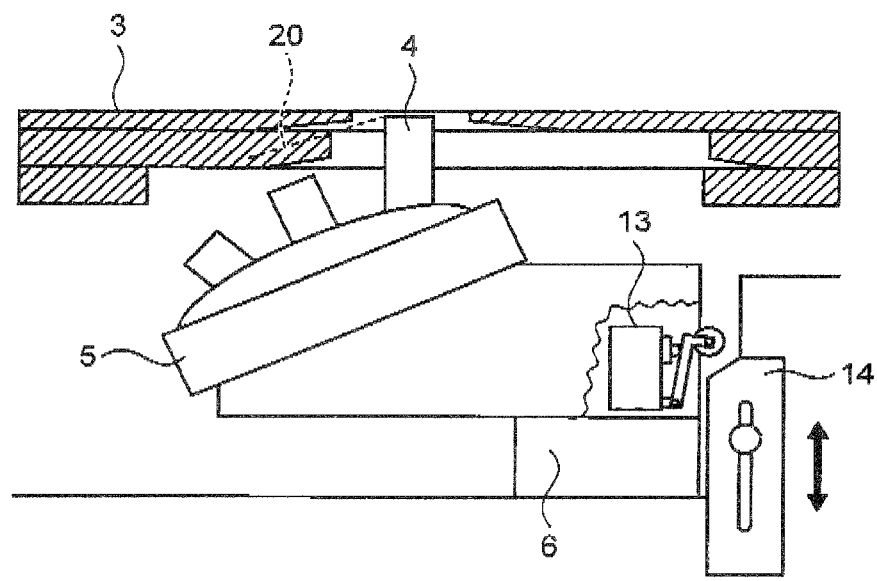
FIG. 16 is a schematic partial cross-sectional diagram illustrating a configuration of an inverted microscope apparatus according to a modified example of the third embodiment of the present invention.

In the third embodiment, although the controller 8 functions as a restriction device, the revolver operation control device 7 may also function as a restriction device. In addition, for user's convenience, the restriction of the transmission of the information on the selection of the objective lens 4 may be selectively lifted. In addition, in the third embodiment, although the inverted microscope apparatus is described as an example, the same description can be applied to an upright microscope apparatus. Further, as illustrated, in FIG. 16, the height of the protrusion 14 may be adjusted, so that the position where the microswitch 13 is pressed, that is, the relative distance for preventing the contact of the objective lens 4 with the stage 3 can be adjusted. In addition, the storage device 17 may store the command of selection of the objective lens 4, so that when the information on the selection of the objective lens 4 is input under the condition that the microswitch 13 is not switched to a state where the electric revolver 5 is in an operable state (i.e., the microswitch 13 is in a switch-off state), the information on the selection is stored in the storage device 17, and when the microswitch 13 is pressed, the information in the storage device 17 is acquired to switch the objective lens 4.

According to the third embodiment, since it is determined whether the switching operation between the objective lenses 4 is possible or not, by using the microswitch 13 arranged on the rear side surface of the electric revolver 5, it is possible to prevent of contacting the objective lens 4 with the stage 3 during the switching operation between the objective lenses 4, with a simple configuration, without performing complicated processes such as tracing the rotation trajectory of the objective lens 4.

In addition, as Modified Example of the third embodiment, if the electric stage 3A is provided, the embodiment may be applied to the restriction of the command of returning the electric stage 3A to the origin.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope apparatus comprising:
   a stage on which a specimen is mountable;
   a revolver that holds a plurality of objective lenses and is configured to cause one of the plurality of objective lenses to be arranged on an observation light axis by a revolving motion, the revolver being an electric movable device that is electrically operable and configured to revolve electrically;
   an input device configured to input a command for operating the electric movable device;
   a focusing handle that is rotatable by a user operation;
   a manual focusing device that is not motorized and that is configured to adjust a relative distance between the stage and the objective lenses in response to rotation of the focusing handle by the user operation;
   an operation control device configured to control operation of the electric movable device;
   a state determining device that is a physical switch mounted on the revolver and that is configured to determine that the electric movable device is in an operable state when the objective lenses and the stage are separated by at least a specified interval and to determine that the electric movable device is in an inoperable state when the objective lenses and the stage are separated by less than the specified interval; and
   a restriction device configured to restrict an output of a control signal for commanding the operation to the operation control device when the command for operating the electric movable device is input by the input device if the state determining device determines that the electric movable device is in the inoperable state,
   wherein the revolver together with the state determining device is attachable to the manual focusing device, and is selectively replaceable with a second revolver that is not motorized and does not have the state determining device, and
   wherein the state determining device is mounted on a side of the revolver opposite to the objective lenses.

2. The inverted microscope apparatus according to claim 1, wherein the restriction device is configured to selectively lift the restriction on the output of the control signal to the operation control device.

3. The inverted microscope apparatus according to claim 1, further comprising:
   a storage device that stores the command for operating the electric movable device input by the input device,
   wherein the storage device stores the command when the restriction device restricts the output of the control signal to the operation control device, and
   wherein after the restriction on the output of the control signal is lifted, the restriction device acquires the command from the storage device and outputs the control signal to the operation control device based on the command.

4. The inverted microscope apparatus according to claim 1, wherein at a lower limit of a movable range by the manual focusing device, the state determining device determines that the electric movable device is in the operable state.

* * * * *